United States Patent [19]

Brothers

[11] Patent Number: 5,472,051

[45] Date of Patent: Dec. 5, 1995

[54] LOW TEMPERATURE SET RETARDED WELL CEMENT COMPOSITIONS AND METHODS

[75] Inventor: Lance E. Brothers, Ninnekah, Okla.

[73] Assignee: Halliburton Company, Duncan, Okla.

[21] Appl. No.: 341,739

[22] Filed: Nov. 18, 1994

[51] Int. Cl.⁶ .......................... F21B 33/138; F21B 33/14
[52] U.S. Cl. .......................... 166/293; 106/803; 106/811; 524/5
[58] Field of Search .......................... 166/293; 106/803, 106/811; 524/5

[56] References Cited

U.S. PATENT DOCUMENTS

| | | | |
|---|---|---|---|
| 3,132,693 | 5/1964 | Weisend | 166/293 |
| 4,500,357 | 2/1985 | Brothers et al. | 166/293 X |
| 4,524,828 | 6/1985 | Sabins et al. | 166/293 |
| 4,557,763 | 12/1985 | George et al. | 166/293 X |
| 4,640,942 | 2/1987 | Brothers | 523/130 |
| 4,676,317 | 6/1987 | Fry et al. | 166/293 |
| 4,941,536 | 7/1990 | Brothers et al. | 166/293 |
| 5,049,288 | 9/1991 | Brothers et al. . | |
| 5,341,881 | 8/1994 | Rodrigues | 166/293 |
| 5,355,955 | 10/1994 | Rodrigues et al. | 166/293 |

*Primary Examiner*—George A. Suchfield
*Attorney, Agent, or Firm*—Robert A. Kent; C. Clark Dougherty, Jr.

[57] ABSTRACT

Improved set retarded cement compositions for cementing subterranean zones in wells at low temperatures having excellent short term compressive strength development and methods of using such compositions are provided. The compositions are basically comprised of a hydraulic cement, water and a copolymer containing 2-acrylamido-2-methylpropane sulfonic acid in an amount in the range of from about 65 to about 85 mole percent and acrylic acid in an amount in the range of from about 15 to about 35 mole percent having an average molecular weight below about 5000.

13 Claims, No Drawings

LOW TEMPERATURE SET RETARDED WELL CEMENT COMPOSITIONS AND METHODS

BACKGROUND OF THE INVENTION

1. Field of the Invention

This invention relates to improved low temperature set retarded well cement compositions and methods of cementing subterranean zones in wells using such compositions.

2. Description of the Prior Art

A variety of cementing operations are carried out in the construction and repair of oil, gas and water wells. In such cementing operations, a hydraulic cement is normally mixed with water and other additives to form a pumpable cement composition which is placed into a subterranean zone penetrated by a well bore. After placement in the zone, the cement composition sets into a hard substantially impermeable mass in the zone.

The most common cementing operation performed in the construction of a well is primary cementing whereby a metal pipe string such as casing and/or a liner is placed in the well bore and bonded therein by cement. Primary cementing is accomplished by introducing a cement composition into the annular space between the pipe string and the walls of the well bore, generally by pumping the cement composition downwardly within the pipe string to the bottom thereof and then upwardly into the annulus. Once the cement composition has been placed in the annulus, it is allowed to set into a hard mass therein. The set cement composition bonds the pipe string in the well bore and seals the annulus whereby fluids cannot migrate through the annulus between formations and/or to the surface.

In order to allow a well cement composition time to be mixed on the surface and then pumped into a subterranean zone in a well to be cemented before the cement composition develops gel strength and sets, a set retarding additive is commonly included in the cement composition. Set retarding additives extend the pumping times of cement compositions between mixing and setting whereby they can be placed in desired locations. While the heretofore used set retarding additives successfully extend such pumping times, at low temperatures they often delay the setting of cement compositions for times which are too long, even when only very small quantities of the set retarding additives are utilized. While the cement compositions eventually set, the drilling rig down times while waiting on cement are costly.

Another problem which occurs when a well cement composition used in primary cementing is slow to develop gel strength and to set is the occurrence of pressurized formation fluid flow in the annulus before and after the cement composition sets. Such an occurrence is attributable to the inability of the cement composition to transmit hydrostatic pressure during the transition of the cement composition from a true fluid to a hard, set mass. During the transition phase, initial hydration of the cement composition has begun and the slurry starts to develop static gel strength. While the cement composition has little or no compressive strength, it becomes partially self-supporting which lowers the hydrostatic pressure exerted by the composition on pressurized fluid containing formations penetrated by the well bore. That is, when the cement composition becomes partially self-supporting due to the development of gel strength, any volume reductions in the cement composition result in rapid decreases in the hydrostatic pressure exerted by the composition. Such volume reductions occur as a result of the ongoing hydration reactions and as a result of the loss of part of the fluid phase of the cement composition to permeable subterranean formations. When the pressure exerted by the cement composition falls below the pressure of formation fluids, the formation fluids enter the annulus and flow through the cement composition forming flow passages which remain after the cement composition sets.

While fluid loss reducing additives are commonly included in cement compositions, when the compositions develop gel strength and set over a long period of time after being placed in a location in a well bore, some fluid loss, even though reduced, in combination with the ongoing hydration of the cement compositions can allow pressurized formation fluid migration as described above.

A set retarding additive which has been utilized heretofore and which has rapid gel strength and enhanced compressive strength development is comprised of a copolymer of 2-acrylamido-2-methylpropane sulfonic acid and acrylic acid. The 2-acrylamido-2-methylpropane sulfonic acid is present in the copolymer in an amount in the range of from about 40 to about 60 mole percent with the remainder being acrylic acid. The copolymer set retarding additive is described in U.S. Pat. No. 4,941,536 issued Jul. 17, 1990 to Brothers et al. as well as related U.S. Pat. No. 5,049,288 issued Sep. 17, 1991 to Brothers et al. While the copolymer set retarding additive produces excellent results in cement compositions placed in subterranean zones having temperatures above about 170° F., at temperatures below about 170° F. a cement composition containing the copolymer additive generally does not develop gel strength and compressive strength rapidly enough to prevent excessive down time and/or pressurized formation fluid migration through the cement composition.

Thus, there is a need for improved set retarding cement compositions and methods of using such compositions for cementing subterranean zones in wells at temperatures below about 170° F. whereby after placement, the cement compositions have excellent short-term gel and compressive strength development.

SUMMARY OF THE INVENTION

The present invention provides set retarded cement compositions and methods of using such compositions for cementing wells at temperatures below about 170° F. which meet the above described need and obviate the shortcomings of the prior art. The set retarded cement compositions of the invention are basically comprised of a hydraulic cement, water present in an amount sufficient to form a pumpable slurry and a set retarding additive comprised of a copolymer of 2-acrylamido-2-methylpropane sulfonic acid in an amount in the range of from about 65 to about 85 mole percent and acrylic acid in an amount in the range of from about 15 to about 35 mole percent and having an average molecular weight below about 5000. Methods of using the improved set retarded cement compositions for cementing wells at temperatures below 170° F. are also provided.

It is, therefore, a general object of the present invention to provide improved low temperature set retarded well cement compositions and methods.

Other and further objects, features and advantages of the present invention will be readily apparent to those skilled in the art upon a reading of the description of preferred embodiments which follows.

DESCRIPTION OF PREFERRED EMBODIMENTS

The set retarded cement compositions of this invention for cementing wells at temperatures below about 170° F. are comprised of a hydraulic cement, water present in an amount sufficient to form a pumpable slurry and a set retarding additive comprised of a copolymer of 2-acrylamido-2-methylpropane sulfonic acid in an amount in the range of from about 65 to about 85 mole percent and acrylic acid in an amount in the range of from about 15 to about 35 mole percent.

While various hydraulic cements can be utilized in forming the cement compositions of this invention, Portland cement is preferred and can be, for example, one or more of the various types identified as API Classes A–H and J cements. These cements are identified and defined in *API Specification For Materials And Testing For Well Cements, API Spec. 10A, 21st Ed.*, dated Sep. 1, 1991 of the American Petroleum Institute which is incorporated herein by reference. API Portland cements generally have a maximum particle size of about 90 microns and a specific surface (sometimes referred to as Blaine Fineness) of about 3900 square centimeters per gram. A highly useful and effective cement slurry base for use in accordance with this invention comprises API Class H Portland cement mixed with water to provide a density of from about 11.3 to about 18.0 pounds per gallon.

It is often highly advantageous to use a fine particle size hydraulic cement consisting of particles having diameters no larger than about 30 microns and having a Blaine Fineness no less than about 6000 square centimeters per gram. Preferably, the fine cement particles have diameters no larger than about 17 microns and most preferably no larger than about 11 microns. The Blaine Fineness is preferably greater than about 7000 square centimeters per gram, more preferably about 10,000 square centimeters per gram and still more preferably greater than about 13,000 square centimeters per gram. Methods of utilizing such fine particle size hydraulic cement in well completion and remedial operations are disclosed in U.S. Pat. Nos. 5,121,795 issued Jun. 16, 1992 and 5,125,455 issued Jun. 20, 1992, both of which are incorporated herein by reference.

The water used in the cement compositions of this invention can be water from any source, provided that it does not contain an excess of compounds which adversely react with or otherwise affect other components in the cement compositions. The water is present in a cement composition of this invention in an amount sufficient to form a slurry of the cement, preferably, a slurry which is readily pumpable. Generally, the water is present in the range of from about 30% to about 60% by weight of dry cement in the composition when the cement is of normal particle size. When a cement of fine particle size as described above is used, water is present in the cement composition in an amount in the range of from about 100% to about 200% by weight of dry cement in the composition, and a dispersing agent such as the dispersing agent described in U.S. Pat. No. 4,557,763 issued on Dec. 10, 1985 to George et al. is generally included to facilitate the formation of the cement slurry and prevent the premature gelation thereof.

As is well understood by those skilled in the art, to obtain optimum results in oil, gas and water well cementing applications, a variety of additives are included in the cement compositions utilized. Such additives are used in cement compositions to vary the density, increase or decrease strength, accelerate or retard the time of setting, reduce fluid loss, etc. Essentially, a cement composition meeting the specifications of the American Petroleum Institute is mixed with water and other additives to provide a cement composition having properties appropriate for the conditions existing in each individual subterranean zone to be cemented. In accordance with the present invention, set retarded cement compositions for cementing subterranean zones at temperatures below about 170° F. which rapidly set and develop compressive strength after placement are provided.

As mentioned above, the set retarding additive utilized in accordance with this invention is a copolymer of 2-acrylamido-2-methylpropane sulfonic acid and acrylic acid. The copolymer includes 2-acrylamido-2-methylpropane sulfonic acid in an amount in the range of from about 65 to 85 mole percent and acrylic acid in an amount in the range of from about 15 to about 35 mole percent. More preferably, the copolymer contains 2-acrylamido-2-methylpropane sulfonic acid in an amount in the range of from about 70 to about 80 mole percent with the remainder being acrylic acid. Most preferably, the copolymer contains about 75 mole percent 2-acrylamido-2-methylpropane sulfonic acid and about 25 mole percent acrylic acid. The copolymer also preferably has an average molecular weight below about 5,000, most preferably a molecular weight such that a 10 percent by weight aqueous solution of the copolymer has a Brookfield viscosity at 20 rpm using a No. 1 spindle of about 36 centipoises.

The copolymer can be utilized in the acid form or in a salt form. Numerous salts can be made by neutralizing the acid form of the 2-acrylamido-2-methylpropane sulfonic acid monomer or the copolymer with a base such as sodium hydroxide, ammonium hydroxide or the like. As used herein the term copolymer is intended to include both the acid form of the copolymer and its various salts. The copolymer can be made in accordance with various well known free radical and other polymerization techniques.

A copolymer set retarding additive as described above is included in a cement composition of this invention in an amount sufficient to delay or retard the setting of the composition for the time period required to place the composition in a desired location. When the cement composition is utilized to carry out a completion, remedial or other cementing operation in a subterranean zone penetrated by a well bore, the composition must remain pumpable for a period of time long enough to place it in the subterranean zone to be cemented. The thickening and set times of the cement composition are strongly dependent upon temperature, and to obtain optimum results, a quantity of the copolymer set retarding additive of this invention required to provide the necessary pumping time at the low temperature to be encountered is included in the cement composition to be utilized. Such quantity can be determined in advance by performing thickening time tests of the type described in the above mentioned API Specification 10A. Generally, the set retarding copolymer of this invention is included in a cement composition to be placed in a subterranean zone having a temperature below about 170° F. in an amount in the range of from about 0.1 to about 2.0 percent by weight of dry cement in the composition. More preferably, the copolymer is present in the cement composition in an amount in the range of from about 0.2 to about 1.0 percent by weight of cement in the composition.

While the cement compositions of this invention can be utilized in some applications without a fluid loss reducing additive being present therein, a fluid loss reducing additive is preferably included in the compositions. Any of a variety of known fluid loss reducing additives can be utilized in the compositions so long as such additives do not adversely react with the set retarding copolymer and other components thereof. However, certain of such additives are more preferred than others. For example, preferred fluid loss reducing additives for use in accordance with the present invention are those comprised of graft polymers having backbones of lignin, lignite or their salts and grafted pendant groups of acrylamido-2-methylpropane sulfonic acid, acrylonitrile, N,N-dimethylacrylamide, acrylic acid or N,N-dialkylaminoethylmethacrylate. Such fluid loss reducing additives are described in U.S. Pat. No. 4,676,317 issued on Jan. 30, 1987 to Fry et al. which is incorporated herein by reference.

Another preferred fluid loss reducing additive which can be used in the set retarded cement compositions of this invention is comprised of hydroxyethylcellulose, polyvinylpyrrolidone and an organic sulfonate dispersing agent. The additive is described in U.S. Pat. No. 3,132,693 issued on May 12, 1964 to Charles F. Weisend which is incorporated herein by reference.

Generally, when one of the above described fluid loss reducing additives is included in a cement composition of this invention, the fluid loss reducing additive is present in the composition in an amount in the range of from about 0.2 to about 1.0 percent by weight of hydraulic cement in the composition.

A particularly preferred set retarded cement composition of this invention for use at temperatures in the range of from about 120° F. to about 169° F. is comprised of API Class H Portland cement, water present in an amount sufficient to form a pumpable slurry and a set retarding additive comprised of a copolymer of 2-acrylamido-2-methylpropane sulfonic acid in an amount in the range of from about 65 to about 85 mole percent, most preferably 75 mole percent, and acrylic acid in an amount in the range of from about 15 to about 35 mole percent, most preferably 25 mole percent, and having an average molecular weight below about 5,000 such that a 10 percent by weight aqueous solution of the copolymer has a Brookfield viscosity at 20 rpm using a No. 1 spindle of about 36 centipoises, the set retarding additive being present in the composition in an amount in the range of from about 0.2 to about 1.0 percent by weight of cement therein. The composition can, and preferably does, also include a fluid loss reducing additive of the graft polymer type described above in an amount in the range of from about 0.5 to about 1.0 percent by weight of cement in the composition.

The methods of the present invention for cementing a subterranean zone penetrated by a well bore at temperatures below about 170° F. generally comprise the steps of preparing a set retarded cement composition of the invention as described above, placing the cement composition into the subterranean zone by way of the well bore and allowing the cement composition to set in the zone. The term "subterranean zone" is used herein to mean the annulus between a pipe string and a well bore in which cement is placed in primary cementing operations or any other subterranean location penetrated by a well bore into which a cement composition is placed or squeezed to construct or repair a well.

The set retarded cement composition is prepared on the surface by admixing in a suitable mixing tank or vessel the hydraulic cement used, the water used, the set retarding copolymer described above and other desired additives including a fluid loss reducing additive to form a cement composition having required properties. The set retarded cement composition is then pumped through the well bore into the subterranean zone to be cemented and allowed to set into a hard substantially impermeable mass therein.

Even though the temperatures existing in the well bore and subterranean zone where the cement composition is placed are low, i.e., in the range of from about 120° F. to about 169° F., the cement composition rapidly sets and develops compressive strength.

In order to further illustrate the compositions and methods of the present invention, the following examples are given.

EXAMPLE 1

A base cement slurry comprised of API Class H cement mixed to a 16.4 pound per gallon density with 38% fresh water by weight of cement was prepared. A set retarding copolymer comprised of 2-acrylamido-2-methylpropane sulfonic acid and acrylic acid and described in U.S. Pat. No. 4,941,536 issued on Jul. 17, 1990 to Brothers et al. was combined with test samples of the base cement slurry in an amount of 0.3% by weight of dry cement in the slurry. The specific composition of the set retarding copolymer was 60 mole percent 2-acrylamido-2-methylpropane sulfonic acid and 40 mole percent acrylic acid. The copolymer also had a molecular weight such that a 10% aqueous solution of the copolymer had a Brookfield viscosity at 20 rpm using a UL adapter spindle of from about 2 to less than about 5 centipoises.

A set retarding copolymer utilized in accordance with the present invention, i.e., a copolymer containing 75 mole percent 2-acrylamido-2-methylpropane sulfonic acid and 25 mole percent acrylic acid, was combined with additional test samples of the base cement slurry in an amount of 0.3 percent by weight of dry cement in the slurry. The copolymer had a molecular weight such that a 10% aqueous solution of the copolymer had a Brookfield viscosity at 20 rpm using a No. 1 spindle of about 36 centipoises.

The test samples containing the two set retarding copolymers were subjected to compressive strength development tests at 120° F. and 150° F. in accordance with API procedures set forth in the API Specification 10A referred to above. The compressive strengths of the samples were measured using an ultrasonic cement analyzer, and the times for the cement samples immediately after mixing to develop compressive strengths of 50 psi and 500 psi were determined. The results of these tests are set forth in Table I below.

TABLE I

Compressive Strength Development Tests

| Set Retarding Copolymer Tested | Test Temperature, °F. | Time To Develop 50 psi, hr:min | Time To Develop 500 psi, hr:min |
|---|---|---|---|
| Copolymer A[1] | 120° F. | 8:47 | 10:32 |
| Copolymer B[2] | 120° F. | 5:24 | 7:02 |
| Copolymer A[1] | 150° F. | 7:42 | 8:36 |
| Copolymer B[2] | 150° F. | 4:04 | 4:54 |

[1]Copolymer A consists of 60 mole % 2-acrylamido-2-methylpropane sulfonic acid/40 mole % acrylic acid.
[2]Copolymer B consists of 75 mole % 2-acrylamido-2-methylpropane sulfonic acid/25 mole % acrylic acid.

From the test results shown in Table I, it can be seen that the test cement compositions containing copolymer B, the set retarding copolymer utilized in accordance with the present invention, unexpectedly developed compressive strengths at low temperatures significantly more rapidly than the test compositions containing copolymer A, the set retarding copolymer of U.S. Pat. No. 4,941,536.

EXAMPLE 2

Various quantities of the set retarding copolymer of the present invention described in Example 1 were added to test samples of the base cement slurry described in Example 1. The various test samples containing the set retarding copolymer were tested for thickening times at temperatures ranging from 120° F. to 170° F. and for 24 hour compressive strengths at 150° F. and 200° F. in accordance with the API test procedures set forth in API Specification 10A referred to above. The results of these tests are given in Table II below.

TABLE II

Thickening Time and Compressive Strength Tests[1]

| Amount of Set Retarding Copolymer[2] In Cement Composition, % By Weight Of Cement | Thickening Time, Hr:Min | | | | 24 Hr. Compressive Strength, psi | |
|---|---|---|---|---|---|---|
| | 120° F. | 135° F. | 150° F. | 170° F. | 150° F. | 200° F. |
| 0.1 | 2:29 | — | — | — | — | — |
| 0.2 | 3:49 | 3:10 | — | — | 3490 | 6140 |
| 0.3 | 4:20 | 3:52 | 3:21 | 3:18 | 3760 | 6410 |
| 0.4 | — | 4:15 | — | — | 3610 | 5880 |
| 0.5 | — | 4:26 | 4:01 | 3:48 | 3740 | 6660 |
| 1.0 | — | 5:44 | 5:00 | 4:23 | — | — |

[1]Cement composition comprised of Ideal Class H Portland cement, fresh water and set retarding copolymer.
[2]Set retarding copolymer: 75 mole % 2-acrylamido-2-methylpropane sulfonic acid/25 mole % acrylic acid.

From Table II it can be seen that the set retarded cement compositions of the present invention rapidly thicken and set at low temperatures.

EXAMPLE 3

A cement slurry was prepared using a lightweight cement consisting of equal parts by volume of API Class H Portland cement and a high grade pozzolanic material. The light weight cement was mixed with fresh water in an amount of 4.5 gallons per 84 pound sack to form a cement slurry having a density of 14.9 pounds per gallon. Various quantities of the set retarding copolymer of this invention described in Example 1 were combined with test samples of the lightweight cement slurry. The resulting test cement compositions were tested for thickening times at 150° F., 24 hour compressive strengths at 150° F. and 24 hour compressive strengths at 200° F. The results of these tests are set forth in Table III below.

TABLE III

Thickening Time And Compressive Strength Tests[1]

| Amount Of Set Retarding Copolymer[2] In Cement Composition, % By Weight Of Cement | 150° F. Thickening Time, Hr:Min | 150° F., 24 Hr Compressive Strength, psi | 200° F., 24 Hr. Compressive Strength, psi |
|---|---|---|---|
| 0 | 2:10 | 3040 | 3830 |
| 0.1 | 2:41 | 2230 | 4070 |
| 0.2 | 6:10 | 1650 | 3160 |
| 0.3 | 7:38 | 1290 | 3080 |
| 0.5 | 8:58 | 1110 | 1420 |
| 1.0 | 10:01 | 730 | 110 |

[1]Cement composition comprised of equal parts of API Class H Portland cement and pozzolanic material, fresh water and set retarding copolymer.
[2]Set retarding copolymer: 75 mole % 2-acrylamido-2-methylpropane sulfonic acid/25 mole % acrylic acid.

As shown in Table III even when the lightweight cement slurry tested was retarded to a thickening time of 9 hours with the set retarding copolymer of this invention, the cement composition developed compressive strength in excess of 1,000 psi in 24 hours at 150° F.

EXAMPLE 4

A lightweight cement slurry was prepared utilizing a commercially available lightweight cement, i.e., Trinity "LITE-WATE"™ cement, by mixing the cement with 7.08 gallons of fresh water per 75 pound sack of cement to form a cement slurry having a density of 13 pounds per gallon. Various quantities of the set retarding copolymer of the present invention described in Example 1 were combined with test samples of the cement slurry, and the resulting cement compositions were tested for thickening times at 150° F. and 24 hour compressive strengths at 150° F. The results of these tests are set forth in Table IV below.

TABLE IV

Thickening Time And Compressive Strength Tests[1]

| Amount of Set Retarding Copolymer[2] In Cement Composition, % By Weight Of Cement | 150° F. Thickening Time, Hr:Min | 150° F., 24 Hr. Compressive Strength, psi |
|---|---|---|
| 0 | 1:12 | 2710 |
| 0.3 | 2:27 | 2610 |
| 0.33 | 4:47 | — |
| 0.5 | 4:25 | 2520 |

[1]Cement composition comprised of Trinity "LITE-WATE ™" cement, fresh water and set retarding copolymer.
[2]Set retarding copolymer: 75 mole % 2-acrylamido-2-methylpropane sulfonic acid/25 mole % acrylic acid.
[3]Sodium chloride saturated water substituted for fresh water.

As shown in Table IV, the 24 hour compressive strength of a cement composition of the present invention retarded to give a 4 hour:25 minute thickening time at 150° F. is essentially the same as the compressive strength of the base cement slurry containing no retarder.

EXAMPLE 5

A lightweight cement slurry was prepared by mixing a cement comprised of about 56% by weight API Class H Portland cement, about 22% by weight pozzolanic material and about 22% by weight silica with 11.2 gallons of fresh water per 84 pound sack of the lightweight cement to form a slurry having a density of 12 pounds per gallon. Various quantities of the set retarding copolymer of the present invention described in Example 1 were combined with test samples of the cement slurry. The resulting cement compositions were tested for thickening times at 135° F. and 170° F. and 24 hour compressive strengths at 150° F. and 200° F. The results of these tests are set forth in Table V below.

TABLE V

Thickening Time and Compressive Strength Tests[1]

| Amount Of Set Retarding Copolymer[2] In Cement Composition, | Thickening Time, Hr:Min | | 24 Hr. Compressive Strength, psi | |
|---|---|---|---|---|
| % By Weight Of Cement | 135° F. | 170° F. | 150° F. | 200° F. |
| 0 | 2:15 | — | 900 | 870 |
| 0.2 | 3:20 | — | 1120 | — |

TABLE V-continued

Thickening Time and Compressive Strength Tests[1]

| Amount Of Set Retarding Copolymer[2] In Cement Composition, % By Weight Of Cement | Thickening Time, Hr:Min | | 24 Hr. Compressive Strength, psi | |
|---|---|---|---|---|
| | 135° F. | 170° F. | 150° F. | 200° F. |
| 0.3 | 3:36 | — | 1240 | — |
| 0.4 | 4:23 | — | 1220 | — |
| 0.5 | 7:30 | 4:00 | 1350 | 1040 |
| 0.7 | — | 6:45 | — | 940 |
| 1.0 | — | 8:59 | — | 680 |

[1]Cement composition comprised of light weight cement (56% by wt. API Class H Portland cement, 22% by wt. pozzolanic material and 22% by wt. silica), fresh water and set retarding copolymer.
[2]Set retarding copolymer: 75 mole % 2-acrylamido-2-methylpropane sulfonic acid/25 mole % acrylic acid.

As shown in Table V, the cement compositions of this invention rapidly thicken and develop compressive strength at low temperatures.

EXAMPLE 6

A salt saturated cement slurry was prepared by mixing Ideal API Class H Portland cement, 14.7 pounds of sodium chloride salt per 94 pound sack of cement and 4.7 gallons of fresh water per 94 pound sack of cement whereby the slurry had a density of 16.5 pounds per gallon. Various quantities of the set retarding copolymer of the present invention described in Example 1 were combined with test samples of the slurry, and thickening time tests at 170° F. and 215° F. as well as 24 hour compressive strength tests at 250° F. were conducted on the resulting cement compositions. The results of these tests are set forth in Table VI below.

TABLE VI

Thickening Time and Compressive Strength Tests[1]

| Amount Of Set Retarding Copolymer[2] In Cement Composition, % By Weight Of Cement | 170° F. Thickening Time, Hr:Min | 215° F. Thickening Time, Hr:Min | 215° F., 24 Hr. Compressive Strength, psi |
|---|---|---|---|
| 0 | — | — | 3060 |
| 0.2 | 3:30 | 1:48 | — |
| 0.3 | 4:32 | 2:25 | — |
| 0.4 | 6:07 | — | — |
| 0.5 | — | 3:47 | 2790 |
| 0.7 | — | 4:29 | — |
| 1.0 | — | — | 2530 |

[1]Cement composition comprised of Ideal API Class H Portland cement, sodium chloride, fresh water and set retarding copolymer.
[2]Set retarding copolymer: 75 mole % 2-acrylamido-2-methylpropane sulfonic acid/25 mole % acrylic acid.

From Table VI it can be seen that the presence of the set retarding copolymer has minimal effects on strength development in salt saturated cement slurries.

EXAMPLE 7

A cement composition of the present invention containing a graft polymer fluid loss reducing additive of the type described above was prepared by mixing API Class H Portland cement, the set retarding copolymer of the present invention described in Example 1 in an amount of 0.4 percent by weight of dry cement and the fluid loss reducing additive in an amount of 1 percent by weight of dry cement with 4.3 gallons of fresh water per 94 pound sack of cement to form a cement composition having a density of 16.4 pounds per gallon. Various tests were conducted using test samples of the cement composition in accordance with the API procedures set forth in the API Specification 10A referred to above. The identification of the tests and the results obtained are given in Table VII below.

TABLE VII

API Test Results

| Test | Result |
|---|---|
| Thickening time at 150° F. | 3 hours : 56 minutes |
| Zero gel time at 150° F. | 2 hours : 50 minutes |
| Transition time at 150° F. | 0 hours : 45 minutes |
| 150° F. Farm viscometer data at 600, 300 9 200 and 100 rpm | 108, 54, 36 and 20 |
| 150° F. free water | 1 ml. |
| 150° F. fluid loss | 42 cc/30 minutes |
| 150° F. initial set | 6 hours : 34 minutes |
| 150° F. 24 hour compressive strength | 2,330 psi |

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. An improved method of cementing a subterranean zone penetrated by a well bore at temperatures below about 170° F. comprising the steps of:
   preparing a set retarded cement composition comprising a hydraulic cement, water and a set retarding additive, said set retarding additive being comprised of a copolymer consisting essentially of 2-acrylamido-2-methylpropane sulfonic acid in an amount in the range of from about 65 to about 85 mole percent and acrylic acid in an amount in the range of from about 15 to about 35 mole percent and having an average molecular weight below about 5000;
   placing said cement composition into said subterranean zone by way of said well bore; and
   allowing said cement composition to set in said zone.

2. The method of claim 1 wherein said copolymer consists essentially of 2-acrylamido-2-methylpropane sulfonic acid in an amount of about 75 mole percent and acrylic acid in an amount of about 25 mole percent.

3. The method of claim 1 wherein said set retarding additive is present in said cement composition in an amount in the range of from about 0.1 to about 2.0 percent by weight of hydraulic cement therein.

4. The method of claim 1 wherein said cement composition further comprises a fluid loss reducing additive.

5. The method of claim 4 wherein said fluid loss reducing additive is selected from the group consisting of graft polymers having a backbone of lignin, lignite or their salts and a grafted pendant group of acrylamido-2-methylpropane sulfonic acid, acrylonitrile, N,N-dimethylacrylamide, acrylic acid and N,N-dialkylaminoethylmethacrylate.

6. The method of claim 4 wherein said fluid loss reducing additive is hydroxyethylcellulose, polyvinylpyrrolidone and an organic sulfonate dispersing agent.

7. The method of claim 5 or 6 wherein said fluid loss reducing additive is present in said cement composition in an amount in the range of from about 0.5 to about 1.0 percent by weight of hydraulic cement therein.

8. The method of claim 1 wherein said hydraulic cement is Portland cement.

9. The method of claim 8 wherein water is present in said cement composition in an amount in the range of from about 30 to about 60 percent by weight of hydraulic cement therein.

10. An improved method of cementing a subterranean zone penetrated by a well bore at temperatures below about 170° F. comprising the steps of:

preparing a pumpable set retarded cement composition comprising a Portland hydraulic cement, water, a set retarding additive and a fluid loss reducing additive, said set retarding additive being comprised of a copolymer consisting essentially of 2-acrylamido-2-methylpropane sulfonic acid in an amount in the range of from about 65 to about 85 mole percent and acrylic acid in an amount in the range of from about 15 to about 35 mole percent and having an average molecular weight below about 5000;

pumping said cement composition into said subterranean zone by way of said well bore; and permitting said cement composition to set into a hard mass in said zone.

11. The method of claim 10 wherein said copolymer consists essentially of 2-acrylamido-2-methylpropane sulfonic acid in an amount of about 75 mole percent and acrylic acid in an amount of about 25 mole percent.

12. The method of claim 11 wherein said set retarding additive is present in said cement composition in an amount in the range of from about 0.2 to about 1.0 percent by weight of hydraulic cement therein.

13. The method of claim 12 wherein said fluid loss reducing additive is selected from the group consisting of graft polymers having a backbone of lignin, lignite or their salts and a grafted pendant group of acrylamido-2-methylpropane sulfonic acid, acrylonitrile, N,N-dimethylacrylamide, acrylic acid and N,N-dialkylaminoethylmethacrylate, and wherein said fluid loss reducing additive is present in said cement composition in an amount in the range of from about 0.5 to about 1.0 percent by weight of hydraulic cement therein.

* * * * *